US012769381B2

(12) United States Patent
Simmendinger et al.

(10) Patent No.: US 12,769,381 B2
(45) Date of Patent: Oct. 20, 2026

(54) USING DYNAMIC GLOBAL POLICIES IN POWER AND ENERGY MANAGEMENT ON HIGH PERFORMANCE COMPUTING PLATFORMS

(71) Applicant: Hewlett Packard Enterprise Development LP, Spring, TX (US)

(72) Inventors: Christian Simmendinger, Stuttgart (DE); Marcel Marquardt, Böblingen (DE); Jan Maximilian Mäder, Baden-Württemberg (DE)

(73) Assignee: Hewlett Packard Enterprise Development LP, Spring, TX (US)

( * ) Notice: Subject to any disclaimer, the term of this patent is extended or adjusted under 35 U.S.C. 154(b) by 146 days.

(21) Appl. No.: 18/790,984

(22) Filed: Jul. 31, 2024

(65) Prior Publication Data

US 2026/0037048 A1 Feb. 5, 2026

(51) Int. Cl.
*G06F 1/28* (2006.01)

(52) U.S. Cl.
CPC .................................... *G06F 1/28* (2013.01)

(58) Field of Classification Search
CPC ........................................................ G06F 1/28
USPC ........................................................ 713/340
See application file for complete search history.

(56) References Cited

U.S. PATENT DOCUMENTS 6,047,351 A * 4/2000 Cheng .................... G06F 9/323
710/266
7,203,846 B2 * 4/2007 Bresniker ............ G06F 1/3203
710/72
8,365,175 B2 * 1/2013 Angaluri ............... G06F 9/5094
713/340
2004/0163000 A1 * 8/2004 Kuhlmann ............ G06F 1/3203
713/300
2005/0198636 A1 * 9/2005 Barsness ............. G06F 11/3452
718/100
2009/0265568 A1 * 10/2009 Jackson ................ G06F 1/3203
713/320

(Continued)

OTHER PUBLICATIONS

Bartolini et al., "The HPC PowerStack", available online at <https://hpcpowerstack.github.io/raitenhaslach20.html>, Jun. 17-19, 2020, 4 pages.

(Continued)

*Primary Examiner* — Paul R. Myers
(74) *Attorney, Agent, or Firm* — Yao Legal Services, Inc.

(57) ABSTRACT

A system determines a metric associated with power and energy management in a high performance computing (HPC) system. The HPC system comprises a plurality of nodes running a plurality of jobs, and a node comprises one or more processing elements. The metric is based on a factor which is configurable, an amount of energy consumed by the HPC system, and a runtime associated with the plurality of jobs. The system calculates the metric at a predetermined time interval and identifies a global policy for providing power to the HPC system. The system determines that a change is to be made to the global policy. The system changes the global policy dynamically by: configuring the factor in the metric to a value which corresponds to a new global policy; and setting, based on the configured factor, an assigned power per processing element corresponding to a minimum of the metric.

20 Claims, 9 Drawing Sheets

(56) References Cited

U.S. PATENT DOCUMENTS

| | | | | |
|---|---|---|---|---|
| 2011/0283124 | A1* | 11/2011 | Branover | G06F 1/3275 713/323 |
| 2012/0102351 | A1* | 4/2012 | Tomi | G06F 1/3284 713/340 |
| 2012/0190985 | A1* | 7/2012 | Hisatsu | G01S 7/52077 600/459 |
| 2012/0222036 | A1* | 8/2012 | Yoshimura | H04N 1/00952 718/103 |
| 2013/0338841 | A1* | 12/2013 | Scholtz | H02J 3/06 700/291 |
| 2014/0040474 | A1* | 2/2014 | Blagodurov | G06F 9/5094 709/226 |
| 2014/0372163 | A1* | 12/2014 | Zou | G06Q 10/06312 705/7.22 |
| 2016/0054779 | A1* | 2/2016 | Bodas | G06F 1/3209 700/291 |
| 2016/0179162 | A1* | 6/2016 | Eastep | G06F 1/189 713/320 |
| 2016/0187906 | A1* | 6/2016 | Bodas | G05F 1/66 700/287 |
| 2016/0334846 | A1* | 11/2016 | Donlin | G06F 1/324 |
| 2017/0357302 | A1* | 12/2017 | Dorsey | G06F 1/3206 |
| 2019/0364492 | A1* | 11/2019 | Azizi | H04W 52/0264 |
| 2021/0303410 | A1* | 9/2021 | Lei | G06F 3/0619 |
| 2022/0066456 | A1* | 3/2022 | Ebrahimi Afrouzi | G06F 3/04883 |
| 2025/0094211 | A1* | 3/2025 | Spittle | H04R 5/04 |

OTHER PUBLICATIONS

Corbalan et al., “EAR: Energy management framework for supercomputers”, 2017, 10 pages.

Eastep et al., “Global Extensible Open Power Manager: A Vehicle for HPC Community Collaboration Toward Co-Designed Energy Management Solutions”, 2016, 6 pages.

Flynn et al., “Lecture Notes in Computer Science”, 1978, 89 pages.

Jette et al., “SLURM: Simple Linux Utility for Resource Management”, Jun. 23, 2003, 27 pages.

Martin et al., “Cray Advanced Platform Monitoring and Control (CAPMC)”, 2015, 10 pages.

* cited by examiner

INFORMATION
120

-- GLOBAL POLICIES 121

-- CURRENT GLOBAL POLICY 122

-- INPUT FROM ADMIN USER 123

-- OUTPUT OF ENERGY USAGE ALGORITHM 124

-- METRIC 125

-- ENERGY CONSUMED BY A JOB 126

-- RUNTIME ASSOCIATED WITH A JOB 127

-- EXTERNAL CONDITIONS 128

FIG. 1C

OPERATIONS
129

DETERMINE METRIC
130

CALCULATE THE METRIC
AT PREDETERMINED TIME INTERVALS
132

MAINTAIN A CURRENT GLOBAL POLICY
134

CONFIGURE FACTOR IN METRIC TO A VALUE WHICH
CORRESPONDS TO A NEW GLOBAL POLICY
140

SET THE ASSIGNED POWER PER PROCESSING ELEMENT
CORRESPONDING TO A MINIMUM OF THE METRIC
142

RETURN INFORMATION
144

FIG. 1D

USING DYNAMIC GLOBAL POLICIES IN POWER AND ENERGY MANAGEMENT ON HIGH PERFORMANCE COMPUTING PLATFORMS

BACKGROUND

Field

The unbounded need for compute resources can result in increasingly higher amounts of power required by data centers or in high-performance computing (HPC) environments. The increasing power requirement can result in increased cost. One way to offset the increase in power requirement is to optimize operations and reduce "stranded power" (e.g., the difference between the total amount of power allocated or provisioned to the data center and the actual observed amount of power consumed during operation). In addition, dynamically changing external conditions (e.g., power sources, available cooling, energy prices, and requirements on carbon dioxide emissions) may constrain the power consumption of the system. Current methods for optimizing power in HPC environments may involve simple static uniform power-capping mechanisms. However, these mechanisms may incur substantial application performance penalties, which can result in reducing or negating any beneficial effects.

BRIEF DESCRIPTION OF THE FIGURES

FIG. 1C illustrates information displayed on a component of the environment of FIG. 1A, in accordance with an aspect of the present application.

FIG. 1D illustrates operations performed by a component of the environment of FIG. 1A, in accordance with an aspect of the present application.

In the figures, like reference numerals refer to the same figure elements.

DETAILED DESCRIPTION

Figure 1A:
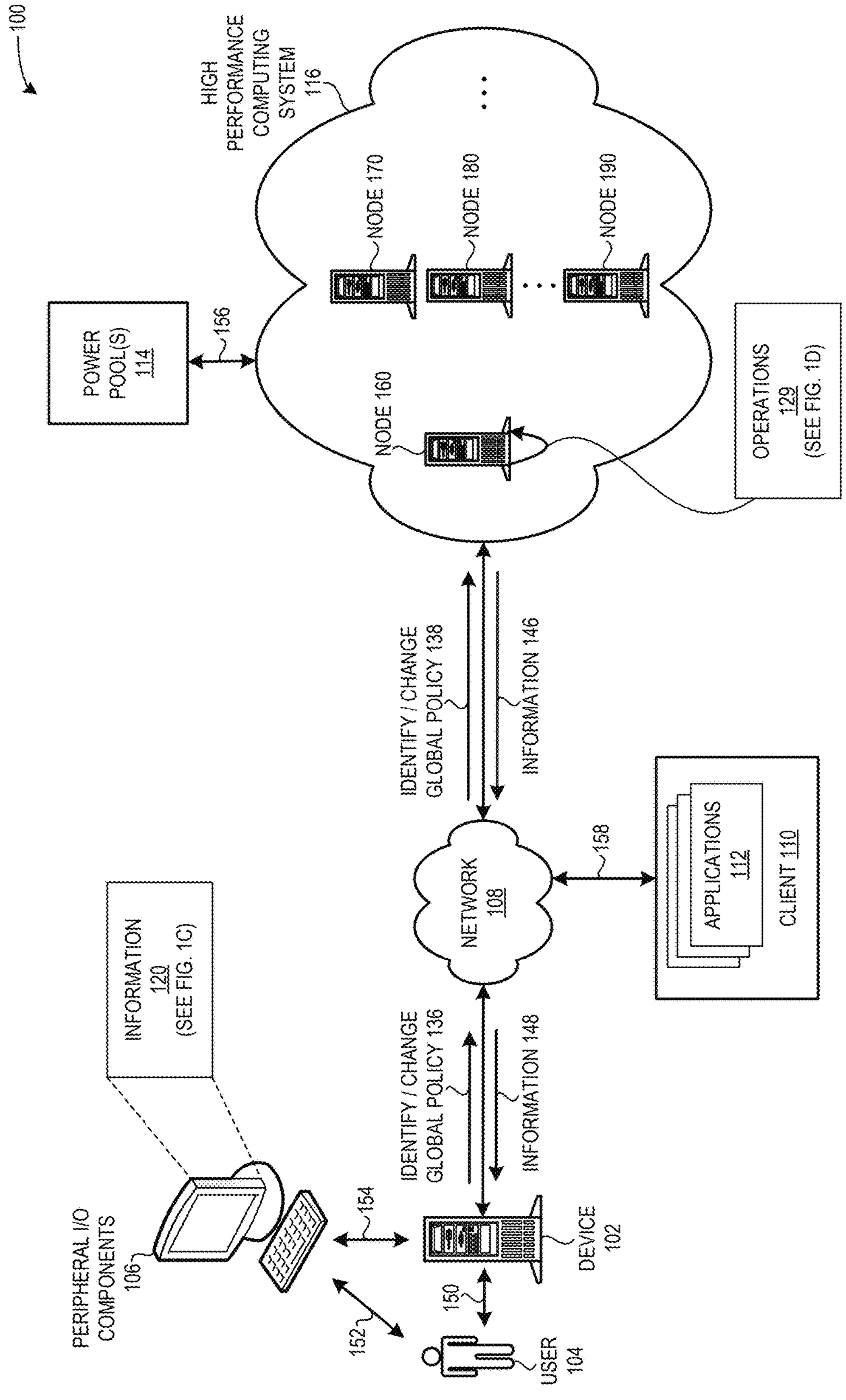
FIG. 1A illustrates an environment which facilitates using dynamic global policies in power and energy management on HPC platforms, in accordance with an aspect of the present application.

Aspects of the instant application address limitations of optimizing power (e.g., in HPC environments) by providing a system which can perform dynamic runtime steering of a global policy, unlike the static power-capping mechanisms of current methods.

As the need for compute resources continues to grow, data centers and HPC systems may require increasingly higher amounts of power. The increasing power requirement can result in increased cost, including both capital expenditures and operating expenses. As power consumption for current and next generation HPC systems continues to increase, refurbishing an existing data center or constructing a new data center can be prohibitively expensive. A more practical solution may be to provide advanced dynamic power and energy management which can fit within the limits of an existing HPC infrastructure. One way to offset the increase in power requirement is to optimize operations and reduce the difference between the total amount of power allocated or provisioned to the data center and the actual observed amount of power consumed during operation (also referred to as "stranded power"). A large amount of stranded power may indicate a heavily over-provisioned system, in which the amount of hardware provided may be more than the amount actually needed or used. In addition, dynamically changing external conditions (e.g., dynamically changing power sources, seasonal changes in available cooling, and fluctuating energy prices) may constrain the power consumption of the system. These changing external conditions may also result in an increased demand for a solution which can fit within the limits of an existing HPC infrastructure.

Current methods or approaches for optimizing power in HPC environments may involve simple static uniform power-capping mechanisms. However, these mechanisms may incur substantial application performance penalties, which can result in reducing or negating any beneficial effects. For example, one current approach describes a technique for reducing stranded system power by using a fictive code flow. However, this approach is not application-aware and instead relies on a constant power redistribution during system runtime. Another current approach can power cap all nodes based on a total system-wide power limit, where the power budget for a group of nodes is allocated at the time the job is launched and further derived based on site policies and available system power budget at launch time. However, this approach provides each node with an identical power budget and the power-capping and energy-per-job must be provided up front at launch time. Yet another current approach uses node-local average power consumption (instead of system-wide peak power consumption) to trigger power management decisions. However, such an approach cannot enforce global policies under external conditions. In another example of a current approach, a hierarchical control system can enable dynamic power coordination between nodes of an application by setting a loop and determining an optimal running average power limit per loop. However, this approach results in a substantial compute overhead and must be run on a dedicated core and repeatedly for every loop.

The described aspects address these limitations by providing a system which optimizes power and energy management in overprovisioned systems, e.g., in an HPC system. The system can steer, from a single access point, the global policy for an entire HPC system dynamically during runtime between a broad range of operational "sweetspots" (i.e., where the assigned power per processing element corresponding to a minimum of a calculated metric is based on different factors, policies, or goals). Examples of operational sweetspots or policies may include: a minimal power consumption policy, in which a minimal amount of power is consumed for all jobs and the HPC system as a whole; a minimal energy to solution policy, in which a minimal amount of power is consumed per job of the plurality of jobs; a minimal total cost of ownership (TCO) to solution policy, in which a minimal amount of cost is consumed per job of the plurality of jobs; and a maximal application performance, in which a minimal runtime is achieved for the plurality of jobs.

An HPC system can include a plurality of nodes with a plurality of processing elements running a plurality of jobs, where applications may be associated with or correspond to the jobs. An example HPC environment is described below in relation to FIGS. 1A-D. The system may govern individual applications and jobs based on both a job-specific policy and a global policy. The job-specific policy may be a static job property, while the global policy may change dynamically, e.g., based on constantly changing external conditions. Static job-specific policies can lead to static capping values, as described above (e.g., benchmark or profiling queues). Static job-specific policies can also indicate a job priority, as described below.

The system can enforce the job-specific policies and the global policy by optimizing a metric, also referred to as the "energy delay product" (EDP) or the "power delay product." The EDP can be a product of the current power consumption and the runtime for a given job. The current power consumption can be referred to as the "energy per device" (e.g., the energy consumed per processing element, such as a central processing unit (CPU) or general processing unit (GPU)). The runtime can be a proxy for application performance and may be represented or expressed as, e.g., a delay or an amount of time spent in executing applications associated with jobs. The runtime may also be indicated as a number of instructions per second which have been executed in a prior predetermined time interval, also referred to as "Retired Instructions Per Second" (RIPS). The RIPS can indicate the steady state for an instruction stream, and the delay can be expressed as 1/RIPS. For a repetitive workload, the delay may also be expressed in terms of the data transfer rate over the network. Other measures of the runtime can include, but are not limited to, the number of GPU kernels, the number or size of packets transferred, and the number of parallel regions in use.

The metric or EDP may be based on a configurable factor "F." For example, the metric can be expressed as "energy" times "runtime," where "energy" can be expressed as "F+energy per device," and "runtime" can be expressed as "1/RIPS." Thus, the metric can be expressed as follows:

$$\text{Metric}=(F+\text{energy per device})/\text{RIPS} \qquad \text{Equation (1)}$$

In general, a power and energy management system can perform an iterative narrowing of a search space for the optimized metric by assigning new power limits per device (i.e., per processing element) in predetermined time intervals.

Aspects of the described system can dynamically control the global policy by determining the metric (i.e., Equation (1)) and continuously monitoring power usage in a system (e.g., an HPC system). The system can calculate the metric at predetermined time intervals (as described below in relation to FIGS. 3 and 4A). The system can display information associated with the current global policy and provide a single access point from which to dynamically steer the global power and energy management policy for the entire HPC system. The single access point can be via a user input or via an output of an algorithm. The global policy can include, but is not limited to: a minimal power consumption policy; a minimal energy to solution policy; a minimal total cost of ownership (TCO) to solution policy; and a maximal application performance. Using dynamic global policies can result in a system which can react and adapt quickly and efficiently to external conditions, which can further result in more efficient use of increasing compute resource requirements and associated increasing power needs in complex computing environments, such as HPC systems.

Figure 1B:
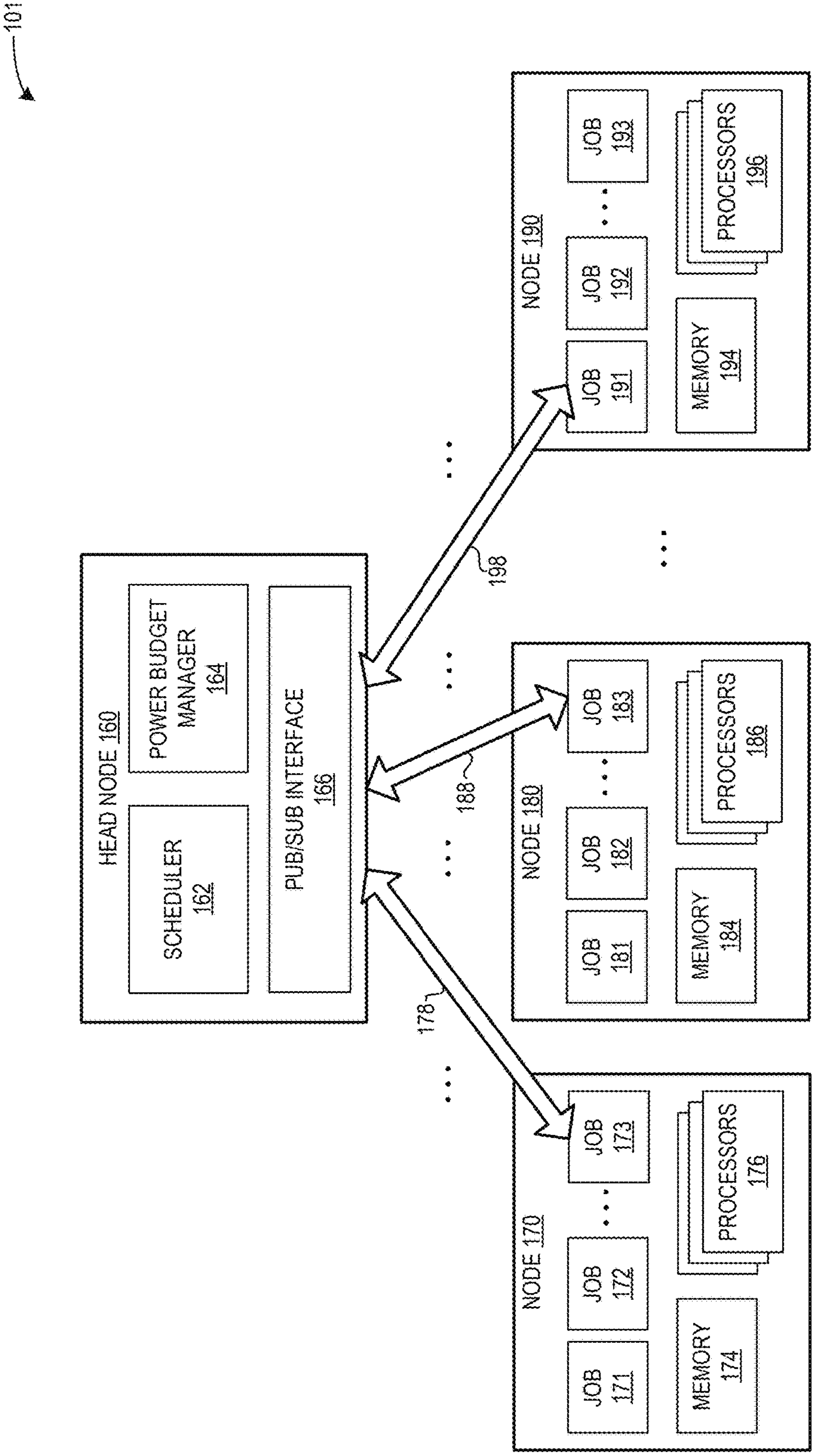
FIG. 1B illustrates an environment depicting a detailed portion of the HPC system of FIG. 1A, in accordance with an aspect of the present application.

FIG. 1A illustrates an environment 100 which facilitates using dynamic global policies in power and energy management on HPC platforms, in accordance with an aspect of the present application. FIG. 1B illustrates an environment 101 depicting a detailed portion of HPC system 116 of FIG. 1A, in accordance with an aspect of the present application. FIG. 1C illustrates information 120 displayed on a component of the environment of FIG. 1A, in accordance with an aspect of the present application. FIG. 1D illustrates operations 129 performed by a component of the environment of FIG. 1A, in accordance with an aspect of the present application. Environment 100 may include a device 102, a client 110, and a high performance computing (HPC) system 116 which communicate over a network 108. Device 102 can be associated with a user 104 and peripheral input/output (I/O) components 106. Device 102 can receive commands from user 104 and display information on or receive data from peripheral I/O components 106 via, respectively, communications 150 and 154. User 104 can communicate with or send commands to device 102 using peripheral I/O components 106 via communications 150 and 152. Various elements or information 120 (as depicted in FIG. 1C) may be displayed (or entered or manipulated) using peripheral I/O components 106. Client 110 can include or be running or executing multiple applications 112 which communicate with HPC system 116 via a communication 158. HPC system 116 can include a plurality of nodes, including, e.g., a head or controller node 160, a node 170, a node 180, and a node 190. The plurality of nodes in HPC system 116 can be running a plurality of jobs, as depicted below in relation to FIG. 1B. Nodes or other components or entities in HPC system 116 can receive power from one or more power pools 114 via, e.g., a communication 156.

During operation, client 110 may be executing applications 112, which are associated with jobs running on a plurality of nodes in HPC system 116, e.g., nodes 170-190. Node 160 can perform operations 129 (as depicted in FIG. 1D). Node 160 can determine a metric associated with power and energy management in HPC system 116 (operation 130). The metric can be based on a factor which is configurable, an amount of energy consumed by HPC system 116, and a runtime associated with the plurality of jobs running on the plurality of nodes in HPC system 116. The metric can be as described above in relation to Equation (1): (F+energy per device)/RIPS, where "F" is the configurable factor, "energy per device" indicates the amount of energy consumed per processing element by the HPC system, and "1/RIPS" indicates the delay or runtime associated with running jobs on the nodes of the HPC system. Node 160 can calculate the metric at a predetermined time interval (operation 132), e.g., every minute, two minutes, or five minutes.

Node 160 can maintain a global policy (operation 134), i.e., store or record the current global policy for providing power, e.g., via power pool(s) 114, as well as the elements of the metric associated with the current global policy. Thus, node 160 can identify the global policy for providing power to HPC system 116. In some aspects, device 102, based on an action taken by user 104 using peripheral I/O components 106, may send an identify global policy 136 request. HPC system 116 (e.g., by node 160) may receive the request (as an identify global policy 138 request) and return information (operation 144) to device 102, including the current global policy (as information 146 and 148). Device 102 may display information 120 (as depicted in FIG. 1C), e.g., a set of possible global policies 121 as well as the current global policy 122.

Device 102 can send a command to node 160 (via communications 136 and 138) to change the global policy dynamically. Device 102 may determine that a change is to made to the global policy. For example, external conditions 128 may be displayed on peripheral I/O components 106 for user 104 to see. A change in external conditions 128 may also be indicated, which can allow user 104 to determine that a change is to be made in the global policy. In some aspects, device 102 or node 160 may be configured to access information associated with the external conditions and determine that a change is to be made in the global policy based on a certain amount of change in the external conditions. Examples of external conditions may include, e.g.: dynamically changing power sources or providers; seasonal changes in available cooling, including announcements of brown-outs; fluctuating energy prices; and requirements relating to carbon dioxide or other emissions.

In further aspects, user 104 may determine that a change is to be made to the global policy, e.g., based on displayed external conditions 128. User 104 may be an administrative user associated with HPC system 116 and can provide an input (element 123) to be sent to node 160 via device 102. The input from the administrative user (element 123) can also be displayed as part of information 120 and may be used by node 160 to configure the factor in the metric. In another aspect, node 160 can configure the factor in the metric based on an output of an energy usage algorithm (not shown), and the output of the energy usage algorithm 124 can also be displayed as part of information 120. Information 120 can also include the metric (element 125), which can include the energy consumed by a job (or jobs) (element 126) as well as the runtime associated with a job (or jobs) (element 127).

Node 160 can determine or receive a request or command to change the global policy, e.g., to a new global policy as indicated in communications 136/138 or as determined by node 160. Node 160 can configure the factor in the metric to a value which corresponds to the new global policy (operation 140) and set an assigned power per processing element corresponding to the minimum of the metric (i.e., a "sweet-spot") for HPC system 116 (operation 142). As described above, node 160 can return information (operation 144, which sends information 146) to device 102. Device 102 can receive information 146 (as information 148), which can be displayed (and, in some instances, acted upon) as information 120.

In FIGS. 1A and 1B, environment 101 depicts nodes 160, 170, 180, and 190 (as in HPC system 116 of FIG. 1A). Node 160 may be a controller or head node and can include: a scheduler 162 component or logic block; a power budget manager 164 component or logic block; and a publish/subscribe ("pub/sub") interface 166. Each of nodes 170-190 may include: multiple jobs running on the node, where the jobs are associated with applications; a memory, which can be volatile or non-volatile; and one or more cores, processing elements, or processors (e.g., CPUs or GPUs) for executing the multiple jobs running on the node. For example, node 170 can include: jobs 171, 172, and 173; a memory 174; and one or more processing elements or processors 176. Similarly, node 180 can include: jobs 181, 182, and 183; a memory 184; and one or more processing elements or processors 186. Finally, node 190 can include: jobs 191, 192, and 193; a memory 194; and one or more processing elements or processors 196.

Scheduler 162 can determine when certain jobs are to be run in a certain node. Power budget manager 164 can determine how to distribute power to the specific jobs running in the nodes as well as to the nodes themselves, based on the global policy described above. Power distribution and job-scheduling may be executed through pub/sub interface 166 and provided via, e.g., communications 178, 188, and 198.

Figure 2:
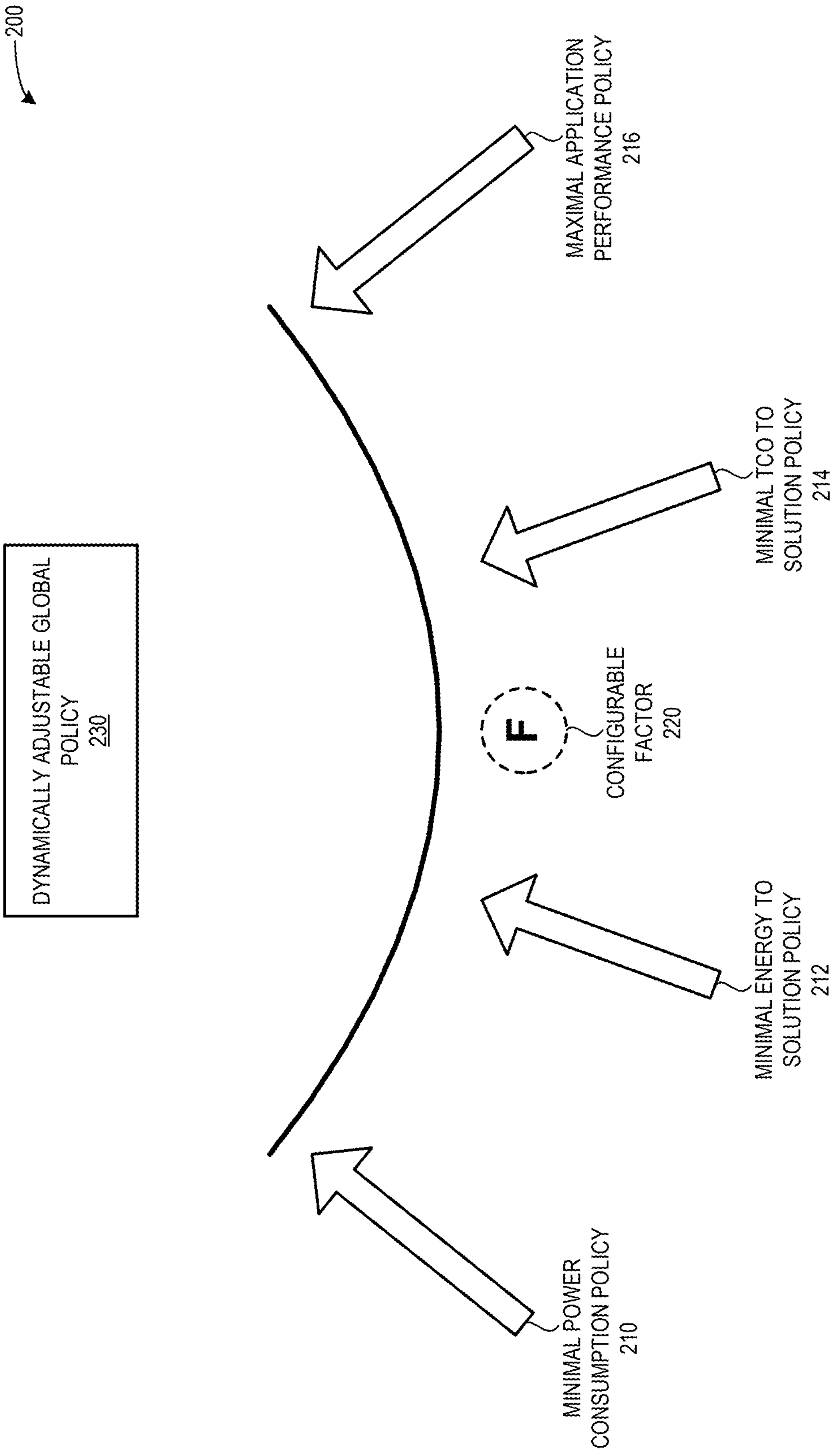
FIG. 2 illustrates a diagram of global policies which can be configured by adjusting a factor in a metric, in accordance with an aspect of the present application.

FIG. 2 illustrates a diagram 200 of global policies which can be configured by adjusting a factor in a metric, in accordance with an aspect of the present application. In diagram 200, a head node (such as head node 160 of FIGS. 1A and 1B) can implement a dynamically adjustable global policy 230, which can be enforced or used to control the power and energy management of an HPC system (e.g., HPC system 116 of FIG. 1A). Diagram 200 depicts how adjusting a configurable factor 220 ("F") can result in the head node steering the entire HPC system, e.g., based on the system load or external conditions. As the configurable factor F moves from a value of "O" to a much larger value, the head node can steer the global policy from a policy 210 to a policy 212 to a policy 214 to a policy 216. Configurable factor F 220 can be controlled directly via a physical knob on a controlling device or may be controlled indirectly via a logical knob or a command sent to the system.

A value of "0" (a "first value") may indicate that power and energy depend only on the job-specific portion. Thus, optimizing the EDP would lead to a "minimal power consumption policy 210" for all jobs and for the HPC site as a whole. One optimization may be to increase the value of F to a "second value" (greater than zero and less than a "third value"), which can account for the average power consumption per node and can optionally factor in the average energy cost for storage and network as well as the power usage efficiency (PUE). This can result in a "minimal energy to solution policy 212" for a specific application, e.g., in which a minimal amount of power is consumed per job of a plurality of jobs.

Configurable factor 220 ("F") may be used to express energy as a fraction of the total cost of ownership (TCO), in that TCO can be expressed in terms of energy cost. One optimization for the corresponding value in the EDP may be to increase the value of F to the "third value" (greater than the second value and less than a "fourth value"), which can result in the equivalent "minimal TCO to solution policy 214," e.g., in which a minimal amount of cost is consumed per job of a plurality of jobs. Finally, at the extreme point of power and energy management for the HPC system, configurable factor 220 ("F") can be increased even further to the "fourth value," which can result in making the energy term of the EDP a constant with minimal changes based on the dynamically changing portion of the EDP. One optimization for the corresponding value in the EDP may result in achieving a minimal runtime for a plurality of jobs and thus the "maximal application performance policy 216."

Figure 3:
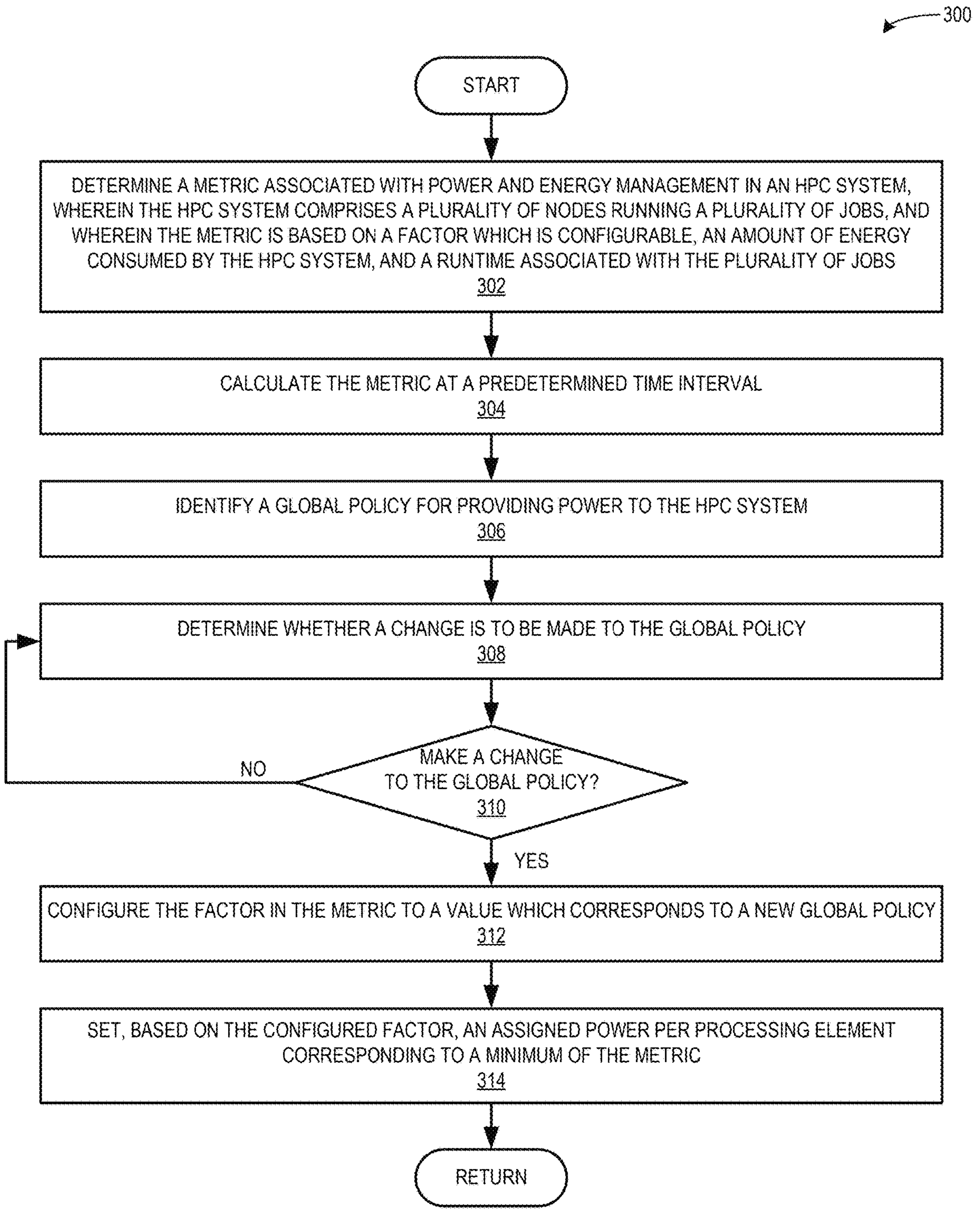
FIG. 3 presents a flowchart illustrating a method which facilitates using dynamic global policies in power and energy management on HPC platforms, in accordance with an aspect of the present application.

FIG. 3 presents a flowchart 300 illustrating a method which facilitates using dynamic global policies in power and energy management on HPC platforms, in accordance with an aspect of the present application. During operation, a system (e.g., head node 160 in FIGS. 1A and 1B) determines a metric associated with power and energy management in a high performance computing (HPC) system, wherein the HPC system comprises a plurality of nodes running a plurality of jobs, wherein a respective node comprises one or more processing elements, and wherein the metric is based on a factor which is configurable, an amount of energy consumed by the HPC system, and a runtime associated with the plurality of jobs (operation 302). For example, HPC system 116 may include at least nodes 160, 170, 180, and 190, where nodes 170-190 can include multiple jobs running on each respective node. As described above in relation to Equation (1), the metric can be expressed as "energy" times "runtime," using F as a configurable factor: (F+energy per device)/RIPS. In some aspects, any of nodes 170-190 can perform the operations of head node 160 as described herein. The system may determine the metric based on, e.g., one or more nodes running jobs in a system comprising multiple nodes, one or more processing elements on one or more nodes, etc.

The system calculates the metric at a predetermined time interval (operation 304), e.g., every two or five minutes. The predetermined time interval can be set by an administrative user of the system or can be based on historical data, e.g., an average amount of time observed for the system to reach a steady state for a given job.

The system identifies a global policy for providing power to the HPC system (operation 306). The system may identify the global policy based on a global policy currently in use by the system. The global policy may be a current policy which is set by the administrative user or the system and controls the power provided to the HPC system. As described above in relation to FIG. 2, the global policy may be one of a plurality of possible global policies, including, e.g.: a minimal power consumption policy; a minimal energy to solution policy; a minimal total cost of ownership (TCO) to solution policy; and a maximal application performance policy. The global policy may be selected by a user based on feedback received from the described aspects of the system (e.g., via information 120 depicted in FIG. 1C).

The system determines whether a change is to be made to the global policy (operation 308). For example, the system may receive an input from an administrative user, where the input indicates a new global policy to be used. The system may also receive the output of an energy usage algorithm, which can indicate that a new global policy is to be used. The energy usage algorithm may determine relevant factors which affect energy consumption as well as the impact of those factors. In some aspects, the energy usage algorithm may reduce computational complexity, which can correlate to reducing energy consumption. In some aspects, external conditions may drive the system to a different global policy than the ones mentioned above. For example, an external goal may be to provide a constant energy transfer to a separate heating sub-system. By steering the power usage in the HPC system, the described aspects can provide a means to regulate heat in a separate system.

If the system determines not to make a change to the global policy (decision 310), the operation returns to operation 308. In some aspects (not shown), the operation may return. If the system determines to make a change to the global policy (decision 310), the system changes the global policy dynamically. That is, the system may change the global policy during run-time of the system, e.g., while jobs are running on the nodes, in order to shift the entire system into a new state.

The system configures the factor in the metric to a value which corresponds to a new global policy (operation 312). The system may configure the factor, e.g., by a user adjusting a physical knob on a hardware component or a virtual knob on a display screen, or by a system component in the head node changing the factor in the metric such that the metric corresponds to the new global policy, as described above in relation to FIG. 2.

The system sets, based on the configured factor, an assigned power per processing element corresponding to a minimum of the metric (operation 314). The assigned power per processing element corresponding to the minimum of the metric can be referred to as the "sweetspot" and can correspond to an amount of power to be granted to the HPC system.

Figure 4A:
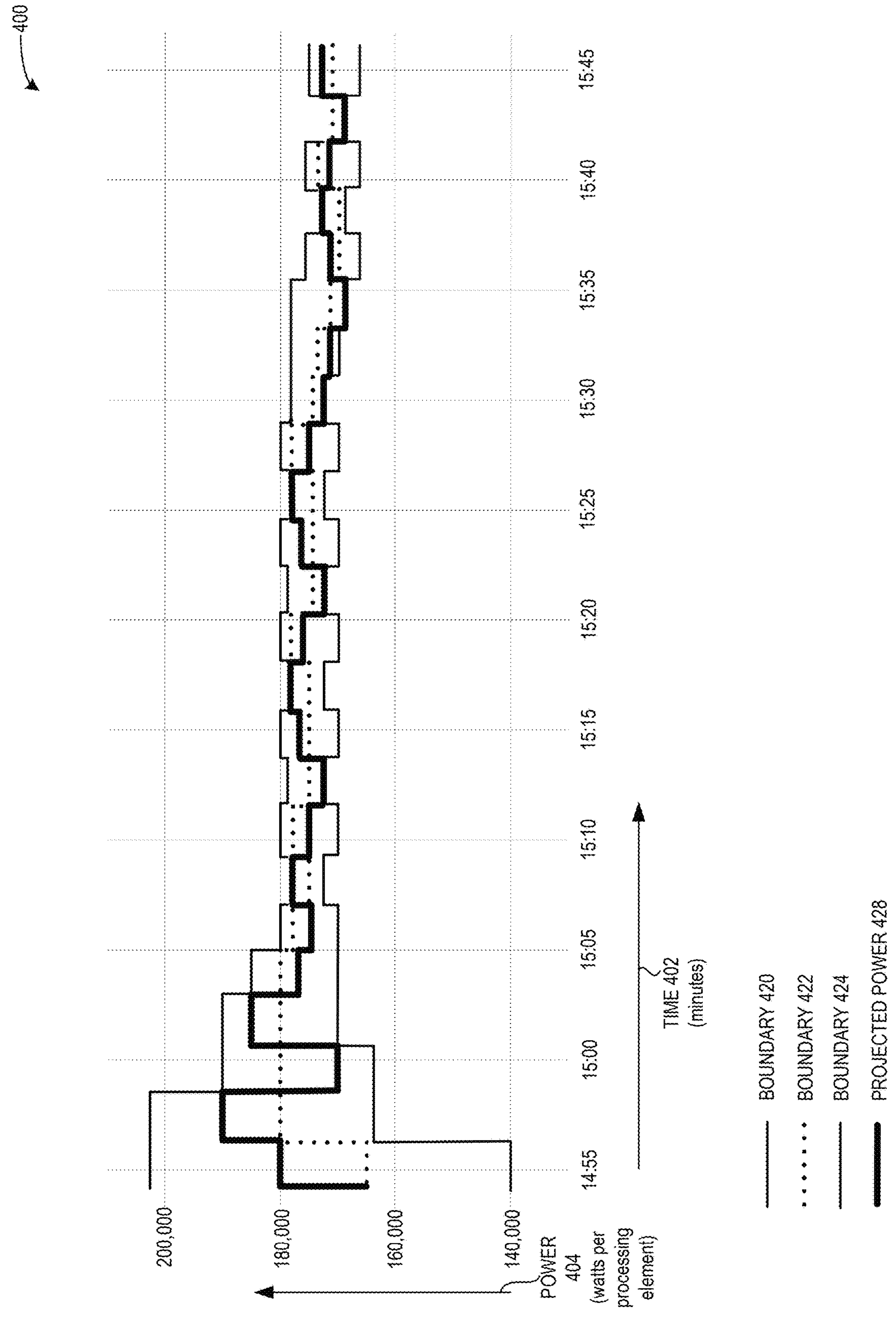
FIG. 4A presents a display screen for a user, including the assigned power per processing element corresponding to the minimum of a metric, in accordance with an aspect of the present application.

FIG. 4A presents a display screen 400 for a user, including the assigned power per processing element corresponding to the minimum of the metric, in accordance with an aspect of the present application. Display screen 400 (as well as display screen 430 of FIG. 4B) can include information which can be presented to an administrative user of an HPC system, as described above in relation to information 120 displayed on peripheral I/O components 106 for user 104 in FIG. 1A. Display screens 400 and 430 of, respectively, FIGS. 4A and 4B, may be part of a graphical user interface (GUI) which provides interactive elements via which the user may manipulate or view data or send requests or commands relating to changing the global policy, e.g., by configuring the factor in the metric in order to dynamically steer the global policy for power and energy management from a single access point.

Display screen 400 can include information from a user dashboard, such as a diagram with an x-axis indicating time 402 (in minutes) and a y-axis indicating power 404 consumed by a given job (in watts per processing element). The measurements of watts per processing element are provided as illustrative examples only. Other units, measurements, or scales to indicate power consumption may be used. Boundaries of the given job over time (including at fixed intervals of five minutes) can be indicated as a solid line (a boundary 420), a dotted line (a boundary 422), and another solid line (a boundary 424). The operational "sweetspot" can be dynamically determined or projected based on the energy consumed over the fixed interval. The heavy solid line can indicate projected power 428, i.e., the determined or projected power at which the given job is to be run or to be assigned to the processing element for running the given job. Projected power 428 can correspond to the minimum of the metric as dynamically determined based on a measurement for a previous time interval for the given job.

Figure 4B:
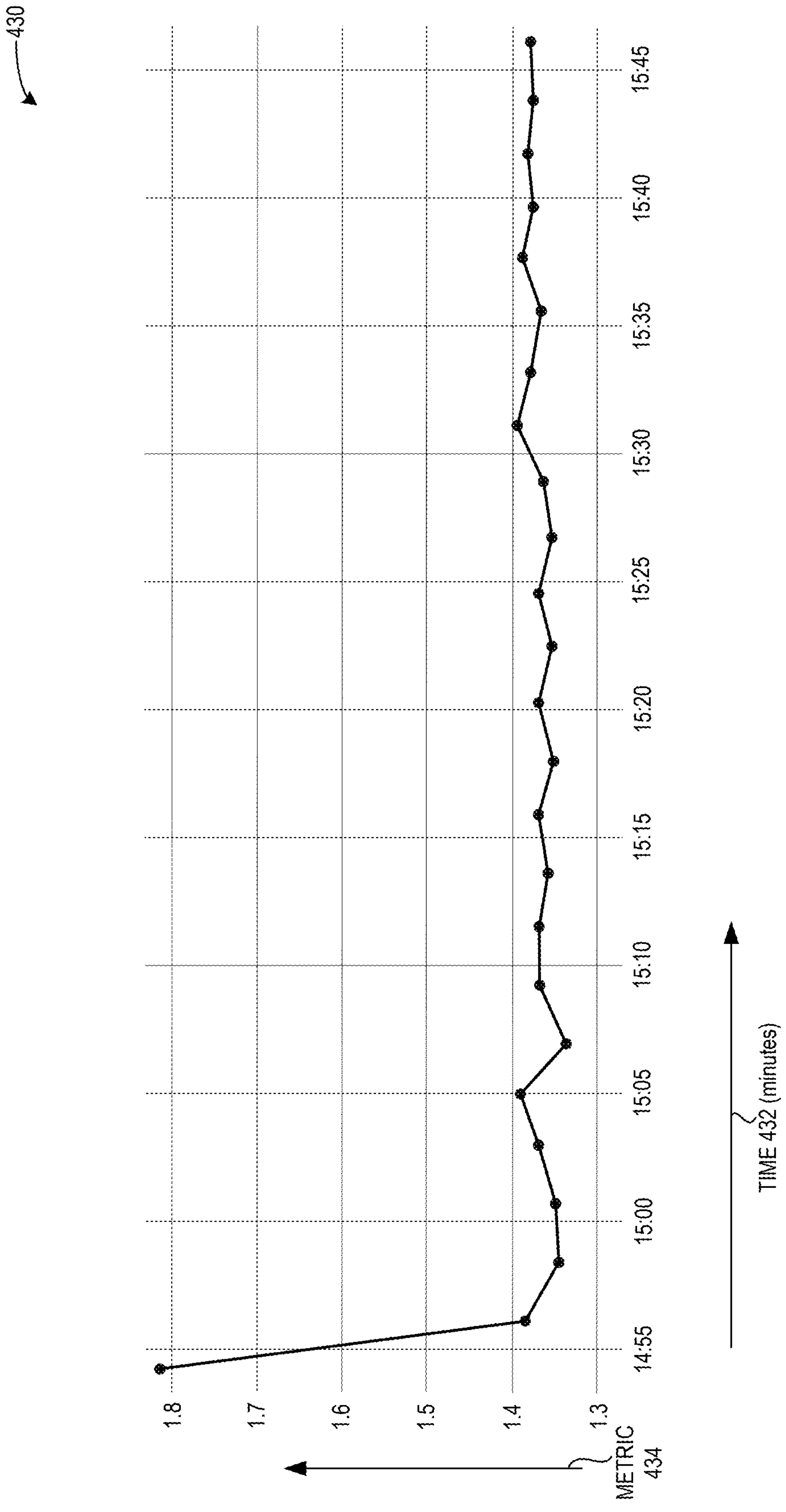
FIG. 4B presents a display screen for a user, including a metric measured over time and the dynamic minimization process of the metric for jobs running in an HPC system, in accordance with an aspect of the present application.

FIG. 4B presents a display screen 430 for a user, including a metric measured over time for jobs running in an HPC system, in accordance with an aspect of the present application. Display screen 430 can also include information displayed on a user dashboard, such as a diagram with an x-axis indicating time 432 (in minutes) and a y-axis indicating the measurement of the metric 434 (from Equation (1)), indicating the energy delay product as "(F+energy per device)/RIPS." Each dot or point in display screen 430 can indicate the measure of the metric taken at that point in time. The measured metric points can be linked together with straight lines to indicate the change in the metric after a certain predetermined or fixed time interval. In some aspects, the display can include an interactive element which allows the user to view any information overlaid with any other information. The user may use the GUI with one or more interactive elements to adjust and manipulate data in various manners. The GUI can allow the user to react to external (or other) conditions in order to dynamically steer the global policy in an HPC system.

Figure 5:
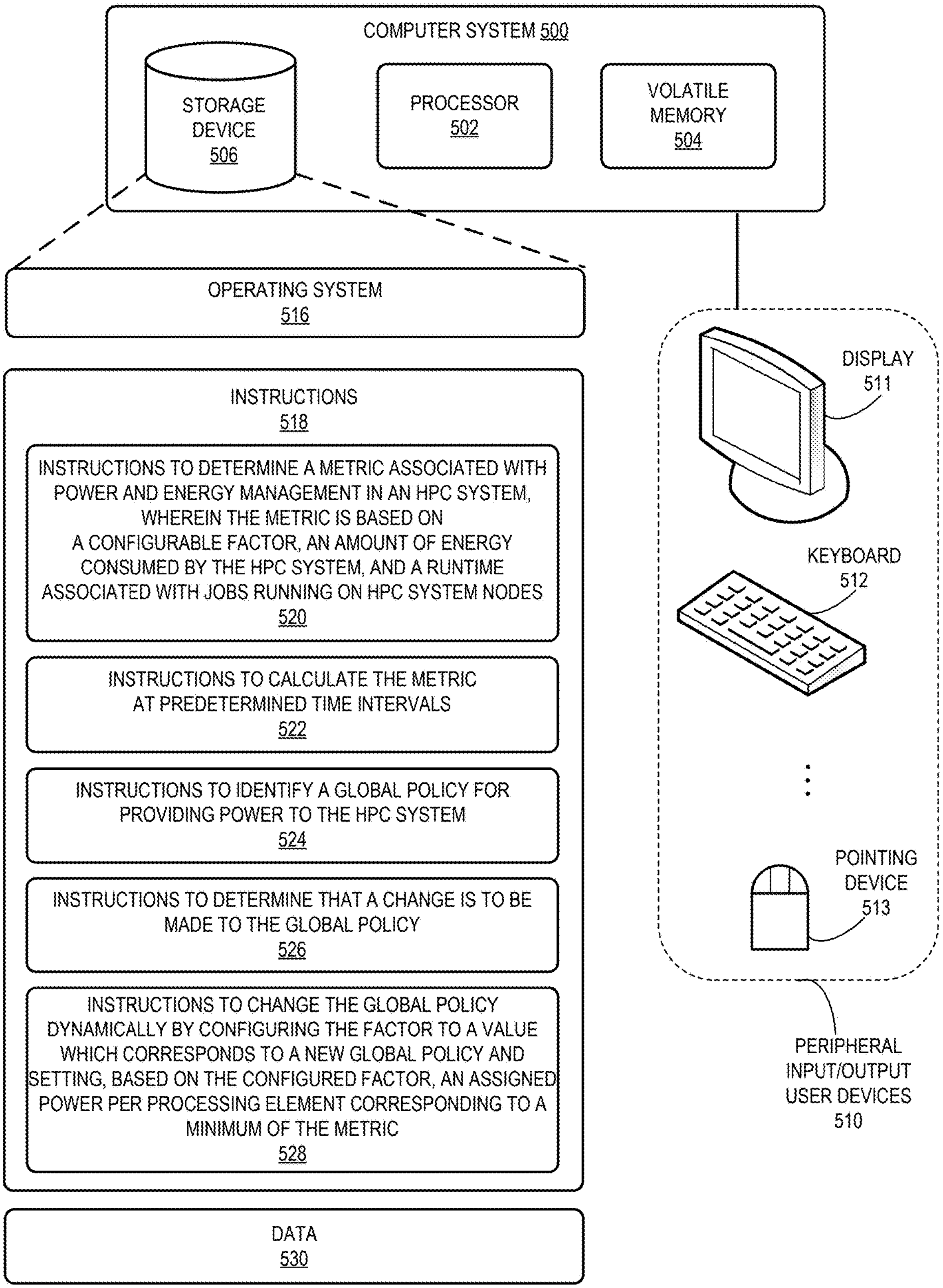
FIG. 5 illustrates a computer system which facilitates using dynamic global policies in power and energy management on HPC platforms, in accordance with an aspect of the present application.

FIG. 5 illustrates a computer system 500 which facilitates using dynamic global policies in power and energy management on HPC platforms, in accordance with an aspect of the present application. Computer system 500 includes a processor 502, a memory 504, and a storage device 506. Memory 504 may include a volatile memory (e.g., random access memory (RAM)) that serves as a managed memory and may be used to store one or more memory pools. Furthermore, computer system 500 may be coupled to peripheral input/output (I/O) user devices 510 (e.g., a display device 511, a keyboard 512, and a pointing device 513). Storage device 506 includes a non-transitory computer-readable storage medium and stores an operating system 516, instructions 518, and data 530. Computer system 500 may be a head node in an HPC system (e.g., head node 160 of FIGS. 1A and 1B) and may include fewer or more entities or instructions than those shown in FIG. 5. Instructions 518 may reside on a single computing device or may be spread across multiple physical and virtual machines communicating in an HPC environment.

Instructions 518 may include instructions 520-528, which when executed by computer system 500 (or by processor 502 of computer system 500) may cause computer system 500 to perform methods and/or processes described in this disclosure. Specifically, instructions 518 may include instructions 520 to determine a metric associated with power and energy management in a high performance computing (HPC) system, wherein the metric is based on a configurable factor, an amount of energy consumed by the HPC system, and a runtime associated with jobs running on HPC system nodes. A node can include one or more processing elements. The metric can be expressed as in Equation (1): Metric=(F+ energy per device)/RIPS.

Instructions 518 may also include instructions 522 to calculate the metric at predetermined time intervals. The predetermined interval can be, e.g., a fixed interval which is determined based on observation of data for jobs running in a system. For example, based on the data depicted in the display screens of FIGS. 4A and 4B, the predetermined or fixed interval may be set to five minutes.

Instructions 518 may include instructions 524 to identify a global policy for providing power to the HPC system. The system can display the current global policy on a display screen for a user interacting with the system using one or more interactive elements on a GUI, as described above in relation to element 122 of FIG. 1C. Instructions 518 may include instructions 526 to determine that a change is to be made to the global policy. This determination can be based on external conditions or other observable factors, e.g., changing power sources, seasonal changes which affect available cooling (such as brown-outs), fluctuating energy prices, and carbon dioxide emission requirements. Determining whether a change is to be made to the global policy is also described above in relation to operation 308 of FIG. 3.

Instructions 518 may further include instructions 528 to change the global policy dynamically by configuring the factor to a value which corresponds to a new global policy and setting, based on the configured factor, an assigned power per processing element corresponding to a minimum of the metric, as described above in relation to configurable factor 220 of FIG. 2, operations 312 and 314 of FIG. 3, and the display screens of FIGS. 4A and 4B.

Data 530 may include any data that is required as input or that is generated as output by the methods, operations, communications, and/or processes described in this disclosure. Specifically, data 530 may store at least: a metric; a minimum of a metric; an indicator or identifier of a node or a head node; an indicator of a scheduling or power budget managing component; a factor; a configurable factor; an amount of energy or a runtime; an amount of energy or a runtime associated with a job or multiple jobs; an indicator of an application; a global policy; a current or new global policy; an indicator or identifier of a node, device, or processing element; an assigned power per processing element corresponding to a minimum of a metric; an amount of time; an amount of time spent executing applications associated with jobs; a number of instructions; a number of instructions per second which have been executed in a certain time interval; a predetermined time interval; historical data; an indicator of a convergence of data to a steady state; a minimal power consumption policy; a minimal energy to solution policy; a minimal TCO to solution policy; a maximal application performance policy; a value; an indicator of an external condition or constraint; an indicator or identifier of a single point of access to an HPC system; an input; an input from an administrative user of the HPC system; and an output of an energy usage algorithm.

Instructions 518 may include more instructions than those shown in FIG. 5. For example, instructions 518 may also store instructions for executing the operations described above in relation to: the environment of FIGS. 1A and 1B; the operations depicted in flowchart 300 of FIG. 3; and the instructions of computer-readable medium 600 in FIG. 6.

Figure 6:
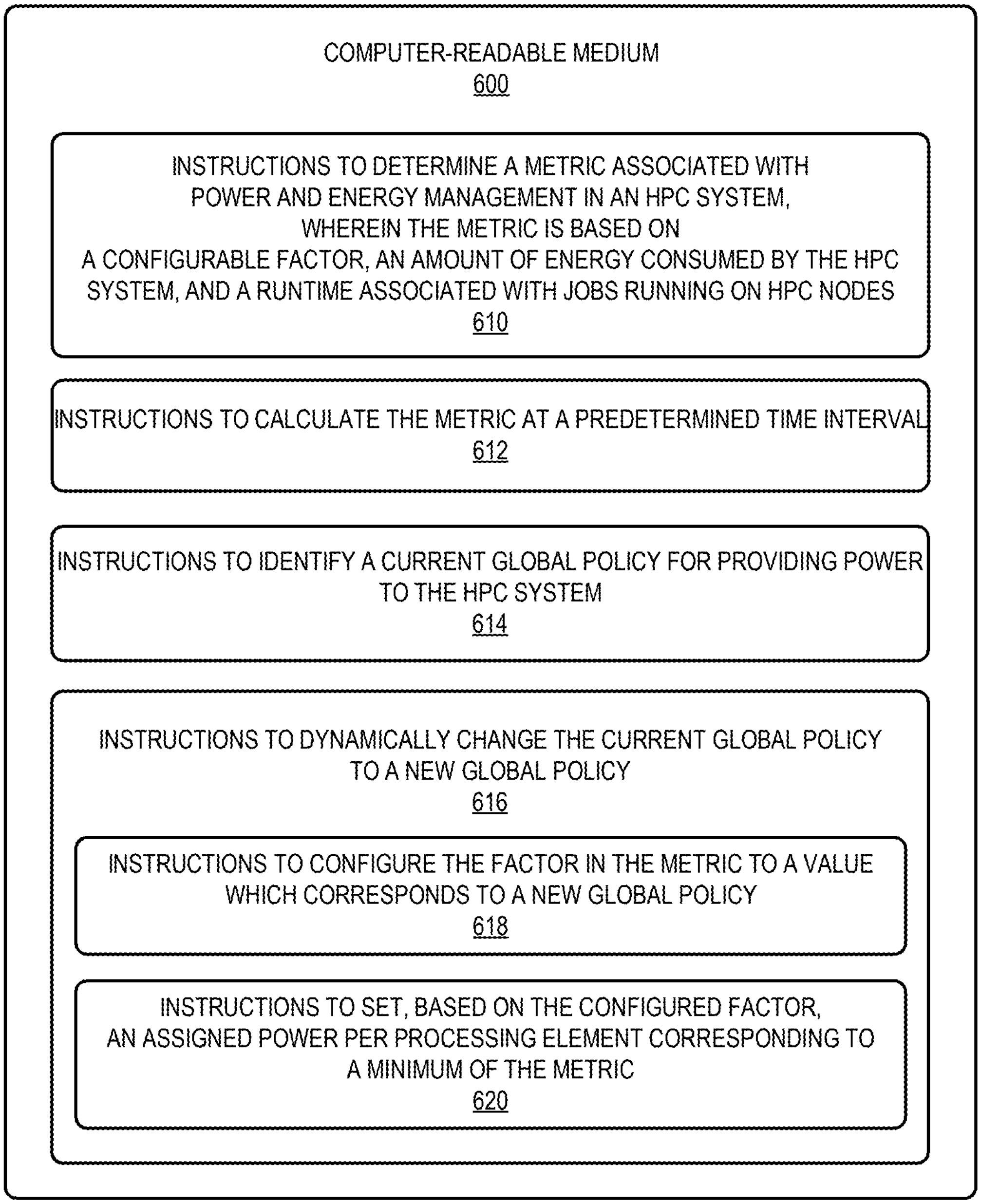
FIG. 6 illustrates a computer-readable medium which facilitates using dynamic global policies in power and energy management on HPC platforms, in accordance with an aspect of the present application.

FIG. 6 illustrates a computer-readable medium 600 which facilitates using dynamic global policies in power and energy management on HPC platforms, in accordance with an aspect of the present application. CRM 600 may be a non-transitory computer-readable medium or device storing instructions that when executed by a computer or processor cause the computer or processor to perform a method. CRM 600 may store instructions 610 to determine a metric associated with power and energy management in an HPC system, wherein the metric is based on a configurable factor, an amount of energy consumed by the HPC system, and a runtime associated with a plurality of jobs running on nodes in the HPC system. The HPC system can comprise a plurality of nodes running a plurality of jobs, and a respective node can comprise one or more processing elements, as described above in relation to nodes 170-190 of FIGS. 1A and 1B. The metric may be expressed as noted above in Equation (1).

CRM 600 may store instructions 612 to calculate the metric at a predetermined time interval, as described above in relation to instructions 522 in FIG. 5 as well as the data depicted in the display screens of FIGS. 4A and 4B. CRM 600 may store instructions 614 to identify a current global policy for providing power to the HPC system, e.g., on a GUI of a display screen or as described above in relation to displaying information 120 on peripheral components 106 in FIG. 1A.

CRM 600 may also store instructions 616 to dynamically change the current global policy to a new global policy, e.g., by adjusting configurable factor 220 via a physical knob, user input, or system input as in FIG. 2. Instructions 616 can include instructions 618 to configure the factor in the metric to a value which corresponds to a new global policy as well as instructions 620 to set, based on the configured factor, an assigned power per processing element corresponding to a minimum of the metric, as described above in relation to configurable factor 220 of FIG. 2, operations 312 and 314 of FIG. 3, and the display screens of FIGS. 4A and 4B.

CRM 600 may include more instructions than those shown in FIG. 6. For example, CRM 600 may also store instructions for executing the operations described above in relation to: the environment of FIGS. 1A and 1B; the operations depicted in flowchart 300 of FIG. 3; and instructions 518 in FIG. 5.

The terms "HPC system," "HPC environment," and "HPC platform" are used interchangeably in this disclosure and refer to a computing environment which includes a plurality of "nodes" running a plurality of jobs, with applications which may be executed by client-like computing devices and which are associated with the jobs. A "node" can be a computing device and can include a memory, one or more cores or processors (also referred to herein as "processing elements"), and one or more jobs which are to be executed or run by the one or more cores or processors, as described below in relation to FIG. 1B. Examples of processing elements can include CPUs and GPUs. The term "energy per device" as used in this disclosure refers "energy per processing element," i.e., energy consumed per processing element (a CPU or GPU).

In general, the disclosed aspects provide a method, a computer system, and a computer-readable medium (CRM) which facilitate using dynamic global policies in power and energy management on HPC platforms. During operation, the system determines a metric associated with power and energy management in a high performance computing (HPC) system, the HPC system comprising a plurality of nodes running a plurality of jobs, a respective node comprising one or more processing elements, and the metric being based on a factor which is configurable, an amount of energy consumed by the HPC system, and a runtime associated with the plurality of jobs. The system calculates the metric at a predetermined time interval. The system identifies a global policy for providing power to the HPC system. The system changes the global policy dynamically by: configuring the factor in the metric to a value which corresponds to a new global policy; and setting, based on the configured factor, an assigned power per processing element corresponding to a minimum of the metric.

In a variation on this aspect, the runtime associated with the plurality of jobs comprises at least one of: a delay or an amount of time spent in executing applications associated with the jobs; a number of instructions per second which have been executed in a prior predetermined time interval; or a rate of data transfer over a network associated with the HPC system.

In a further variation, the predetermined time interval is based on historical data for similar jobs running on the HPC system, and the historical data indicates a convergence of the metric to a steady state.

In a further variation, the global policy and the new global policy comprise at least one of: a minimal power consumption policy, in which a minimal amount of power is consumed for all jobs and the HPC system as a whole; a minimal energy to solution policy, in which a minimal amount of power is consumed per job of the plurality of jobs; a minimal total cost of ownership (TCO) to solution policy, in which a minimal amount of cost is consumed per job of the plurality of jobs; or a maximal application performance, in which a minimal runtime is achieved for the plurality of jobs.

In a further variation, changing the global policy dynamically comprises at least one of: changing the global policy to the minimal power consumption policy by configuring the value of the factor to a first value equal to zero; changing the global policy to the minimal energy to solution policy by configuring the value of the factor to a second value greater than zero and less than a third value; changing the global policy to the minimal TCO to solution policy by configuring the value of the factor to the third value which is less than a fourth value; and changing the global policy to the maximal application performance policy by configuring the value of the factor to the fourth value.

In a further variation, the system changes the global policy dynamically in response to external conditions associated with the HPC system. The external conditions include at least one of: an event affecting the power provided to the HPC system, the event comprising a change in a power source for the HPC system; an event affecting cooling of the HPC system; changing or rising costs of energy; a need to reduce carbon dioxide emissions; or a policy different from the global policy and the new global policy.

In a further variation, the factor is configurable from a single point of access to the HPC system.

In a further variation, the system obtains an input from an administrative user of the HPC system, wherein the input indicates the new global policy. The system configures the factor in the metric based on the input from the administrative user.

In a further variation, the system displays at least one of: the input from the administrative user; the assigned power per processing element corresponding to the minimum of the metric; the metric; the amount of energy consumed by a respective job running in a node of the HPC system; or the runtime associated with the respective job.

In a further variation, the system configures the factor in the metric based on an output of an energy usage algorithm.

In a further variation, setting the assigned power per processing element comprises enforcing the new global policy and a policy specific to a respective job of the plurality of jobs.

In another aspect, a computer system comprises a processor and a storage device storing instructions which when executed by the processor comprise instructions to perform operations. The instructions are to determine a metric associated with power and energy management in an HPC system. The HPC system comprises a plurality of nodes running a plurality of jobs, a respective node comprises one or more processing elements, and the metric is based on a factor which is configurable, an amount of energy consumed by the HPC system, and a runtime associated with the plurality of jobs. The instructions are further to calculate the metric at predetermined time intervals. The instructions are further to identify a global policy for providing power to the HPC system and determine that a change is to be made to the global policy. The instructions are further to change the global policy dynamically by: configuring the factor in the metric to a value which corresponds to a new global policy; and setting, based on the configured factor, an assigned power per processing element corresponding to a minimum of the metric. The computer system may include content-processing instructions which include more instructions, e.g., the instructions to perform the operations described herein, including in relation to: the environment of FIGS. 1A and 1B; the operations depicted in flowchart 300 of FIG. 3; and the instructions of computer-readable medium 600 in FIG. 6.

In yet another aspect, a non-transitory computer-readable storage medium (CRM) stores instructions to determine a metric associated with power and energy management in an HPC system, wherein the HPC system comprises a plurality of nodes running a plurality of jobs, wherein a respective node comprises a plurality of processing elements, and wherein the metric is based on a factor which is configurable, an amount of energy consumed by the HPC system, and a runtime associated with the plurality of jobs. The instructions are further to calculate the metric at a predetermined time interval and identify a current global policy for providing power to the HPC system. The instructions are further to dynamically change the current global policy to a new global policy, which comprises instructions to: configure the factor in the metric to a value which corresponds to a new global policy; and set, based on the configured factor, an assigned power per processing element corresponding to a minimum of the metric. The CRM may also store instructions for executing the operations described above in relation to: the environment of FIGS. 1A and 1B; the operations depicted in flowchart 300 of FIG. 3; and instructions 518 in FIG. 5.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:

determining a metric associated with power and energy management in a high performance computing (HPC) system, the HPC system comprising a plurality of nodes running a plurality of jobs, a respective node comprising one or more processing elements, and the metric being based on a configurable factor, an amount of energy consumed by the HPC system, and a runtime associated with the plurality of jobs, wherein the metric is expressed as a sum of the configurable factor and energy per device, divided by retired instructions per second, and wherein the energy per device indicates energy consumed per processing element by the HPC system and the retired instructions per second indicates a number of instructions per second executed in a prior predetermined time interval;

calculating the metric at a predetermined time interval;

identifying a global policy for providing power to the HPC system; and changing the global policy dynamically by:

configuring the factor in the metric to a value which corresponds to a new global policy; and setting, based on the configured factor, an assigned power per processing element corresponding to a minimum of the metric.

2. The method of claim 1, wherein the runtime associated with the plurality of jobs comprises at least one of:

a delay or an amount of time spent in executing applications associated with the jobs;

a number of instructions per second which have been executed in a prior predetermined time interval; or a rate of data transfer over a network associated with the HPC system.

3. The method of claim 1, wherein the predetermined time interval is based on historical data for similar jobs running on the HPC system, and wherein the historical data indicates a convergence of the metric to a steady state.

4. The method of claim 1, wherein the global policy and the new global policy comprise at least one of:

a minimal power consumption policy, in which a minimal amount of power is consumed for all jobs and the HPC system as a whole;

a minimal energy to solution policy, in which a minimal amount of power is consumed per job of the plurality of jobs;

a minimal total cost of ownership (TCO) to solution policy, in which a minimal amount of cost is consumed per job of the plurality of jobs; or a maximal application performance, in which a minimal runtime is achieved for the plurality of jobs.

5. The method of claim 4, wherein changing the global policy dynamically comprises at least one of:

changing the global policy to the minimal power consumption policy by configuring the value of the factor to a first value equal to zero;

changing the global policy to the minimal energy to solution policy by configuring the value of the factor to a second value greater than zero and less than a third value;

changing the global policy to the minimal TCO to solution policy by configuring the value of the factor to the third value which is less than a fourth value; and changing the global policy to the maximal application performance policy by configuring the value of the factor to the fourth value.

6. The method of claim 1, further comprising:

changing the global policy dynamically in response to external conditions associated with the HPC system, wherein the external conditions include at least one of:

an event affecting the power provided to the HPC system, the event comprising a change in a power source for the HPC system;

an event affecting cooling of the HPC system;

changing or rising costs of energy;

a need to reduce carbon dioxide emissions; or a policy different from the global policy or the new global policy.

7. The method of claim 1, wherein the factor is configurable from a single point of access to the HPC system.

8. The method of claim 1, further comprising:

obtaining an input from an administrative user of the HPC system, wherein the input indicates the new global policy; and configuring the factor in the metric based on the input from the administrative user.

9. The method of claim 8, further comprising:

displaying at least one of:

the input from the administrative user;

the assigned power per processing element corresponding to the minimum of the metric;

the metric;

the amount of energy consumed by a respective job running in a node or processing element of the HPC system; or the runtime associated with the respective job.

10. The method of claim 1, further comprising:

configuring the factor in the metric based on an output of an energy usage algorithm.

11. The method of claim 1, wherein setting the assigned power per processing element comprises enforcing the new global policy and a policy specific to a respective job of the plurality of jobs.

12. A computer system comprising:

a processor; and a storage device storing instructions which when executed by the processor comprise instructions to:

determine a metric associated with power and energy management in a high performance computing (HPC) system, wherein the HPC system comprises a plurality of nodes running a plurality of jobs, wherein a respective node comprises one or more processing elements, wherein the metric is based on a configurable factor, an amount of energy consumed by the HPC system, and a runtime associated with the plurality of jobs, wherein the metric is expressed as a sum of the configurable factor and energy per device, divided by retired instructions per second, and wherein the energy per device indicates energy consumed per processing element by the HPC system and the retired instructions per second indicates a number of instructions per second executed in a prior predetermined time interval;

calculate the metric at predetermined time intervals;

identify a global policy for providing power to the HPC system;

determine that a change is to be made to the global policy; and change the global policy dynamically by:

configuring the factor in the metric to a value which corresponds to a new global policy; and setting, based on the configured factor, an assigned power per processing element corresponding to a minimum of the metric.

13. The computer system of claim 12, wherein the runtime associated with the plurality of jobs comprises at least one of:

a delay or an amount of time spent in executing applications associated with the jobs;

a number of instructions per second which have been executed in a prior predetermined time interval; or a rate of data transfer over a network associated with the HPC system.

14. The computer system of claim 12, wherein the predetermined time interval is based on historical data for similar jobs running on the HPC system, and wherein the historical data indicates a convergence of the metric to a steady state.

15. The computer system of claim 12, wherein the global policy and the new global policy comprise at least one of:

a minimal power consumption policy, in which a minimal amount of power is consumed for all jobs and the HPC system as a whole;

a minimal energy to solution policy, in which a minimal amount of power is consumed per job of the plurality of jobs;

a minimal total cost of ownership (TCO) to solution policy, in which a minimal amount of cost is consumed per job of the plurality of jobs; or a maximal application performance, in which a minimal runtime is achieved for the plurality of jobs.

16. The computer system of claim 15, wherein changing the global policy dynamically comprises at least one of:

changing the global policy to the minimal power consumption policy by configuring the value of the factor to a first value equal to zero;

changing the global policy to the minimal energy to solution policy by configuring the value of the factor to a second value greater than zero and less than a third value;

changing the global policy to the minimal TCO to solution policy by configuring the value of the factor to the third value which is less than a fourth value; and changing the global policy to the maximal application performance policy by configuring the value of the factor to the fourth value.

17. The computer system of claim 12, the instructions further to:

change the global policy dynamically in response to external conditions associated with the HPC system, wherein the external conditions include at least one of:

an event affecting the power provided to the HPC system, the event comprising a change in a power source for the HPC system;

an event affecting cooling of the HPC system;

changing or rising costs of energy;

a need to reduce carbon dioxide emissions; or a policy different from the global policy and the new global policy.

18. The computer system of claim 12, the instructions further to:

configure the factor from a single point of access to the HPC system and further based on at least one of:

an input from an administrative user of the HPC system or an output of an energy usage algorithm.

19. The computer system of claim 18, further comprising:

displaying, on a screen associated with the administrative user, at least one of:

the input from the administrative user;

the output of the energy usage algorithm;

the assigned power per processing element corresponding to the minimum of the metric;

the metric;

the amount of energy consumed by a respective job running in a node or processing element of the HPC system; or the runtime associated with the respective job.

20. A non-transitory computer-readable medium storing instructions to:

determine a metric associated with power and energy management in a high performance computing (HPC) system, wherein the HPC system comprises a plurality of nodes running a plurality of jobs, wherein a respective node comprises one or more processing elements, and wherein the metric is based on a configurable factor, an amount of energy consumed by the HPC system, and a runtime associated with the plurality of jobs, wherein the metric is expressed as a sum of the configurable factor and energy per device, divided by retired instructions per second, and wherein the energy per device indicates energy consumed per processing element by the HPC system and the retired instructions per second indicates a number of instructions per second executed in a prior predetermined time interval;

calculate the metric at a predetermined time interval;

identify a current global policy for providing power to the HPC system; and dynamically change the current global policy to a new global policy, which comprises:

configuring the factor in the metric to a value which corresponds to a new global policy; and setting, based on the configured factor, an assigned power per processing element corresponding to a minimum of the metric.

* * * * *